United States Patent [19]

Porter

[11] Patent Number: 4,694,641

[45] Date of Patent: Sep. 22, 1987

[54] CROP HARVESTING AND SOIL TILLING APPARATUS

[76] Inventor: John R. Porter, 1255 Dublin Rd., Waterloo, N.Y. 13165

[21] Appl. No.: 759,958

[22] Filed: Jul. 29, 1985

[51] Int. Cl.$^4$ ............................................. A01D 46/00
[52] U.S. Cl. ................................ 56/328 R; 56/327 R; 171/28; 171/88
[58] Field of Search ........... 56/327 R, 328 R, 121.4 R, 56/121.41, 121.46, 98, 15.2, 15.5, 16.2; 171/14, 28, 88

[56] References Cited

U.S. PATENT DOCUMENTS

| Re. 31,063 | 10/1982 | Greiner et al. | 56/98 |
| 2,851,842 | 9/1958 | Harp | 56/15.5 X |
| 3,796,268 | 3/1974 | Porter | 56/327 R X |
| 3,999,613 | 12/1976 | Porter | 56/14.3 X |
| 4,244,165 | 1/1981 | McElwain | 56/327 R |
| 4,312,175 | 1/1982 | Barnes | 56/17.3 X |

FOREIGN PATENT DOCUMENTS 2378442 9/1978 France ................................. 56/235

Primary Examiner—Kyle L. Howell
Assistant Examiner—Angela D. Sykes
Attorney, Agent, or Firm—Charles S. McGuire

[57] ABSTRACT

An agricultural implement for movement through a field is adapted to perform a number of functions including severing plant stems from the roots, placing the severed plants in windrows, and preparing soil for planting. The apparatus includes a wheel-mounted frame for attachment to a tractor, a pair of flat discs with notched peripheries mounted for rotation about parallel axes and hydraulic motors for imparting rotation, through drive shafts, to the discs in opposite directions. The discs and their supporting structure are mounted for selectively adjustable movement to vary the spacing of the axes of rotation, thereby placing the disc peripheries in either overlapped or spaced relation. The variable positioning of the disc peripheries governs the function performed by the apparatus and may be augmented by using discs of different diameters as well as by adjusting the spacing of the rotational axes.

10 Claims, 5 Drawing Figures

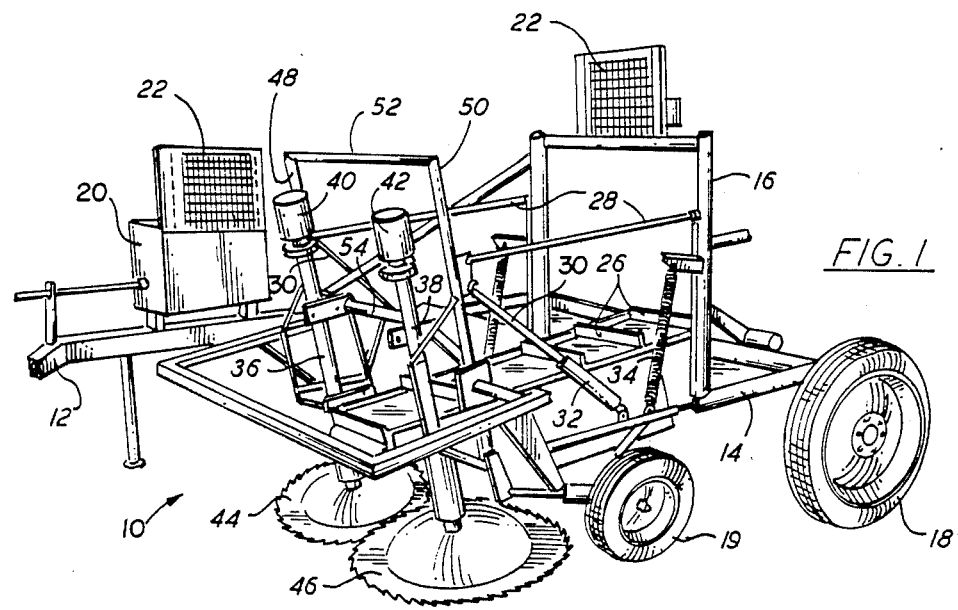

CROP HARVESTING AND SOIL TILLING APPARATUS

BACKGROUND OF THE INVENTION

The present invention relates to agricultural equipment adaptable to perform a variety of functions as it is moved through a field, and more specifically to such equipment which includes selectively adjustable and interchangeable mechanism for laterally positioning a pair of soil or crop engaging members to perform different functions.

U.S. Pat. No. 3,796,268 of Wellington W. Porter discloses apparatus including a pair of counter-rotating disks having overlapped peripheries for movement along a row of crops to sever upper portions of the plants from underlying portions, or to dig up underground portions of the plants or crops, and deposit them in windrows for later retreival. The disks may be raised and lowered in unison by means of a parallelogram linkage and angle of the parallel planes of the overlapped disks with respect to the ground is also selectively adjustable. U.S. Pat. No. 3,999,613 of the same inventor discloses harvesting apparatus including a pair of disks of unique configuration mounted in overlapped relation for engaging and severing the stems of plants such as tomatoes, and delivering the plants rearwardly to a section for separating the fruit from the plants.

While the disks of the latter-mentioned patent may advantageously be substituted for those disclosed with the apparatus of the former, the blades are still mounted in the same relative positions. Once mounted, the blades are rotatable relative to one another but are not otherwise relatively movable. The raising and lowering, as well as the tilting movement is performed by moving the blades together, without changing their positions relative to one another. This limits utility of the apparatus essentially to the plant cutting or digging operations, with the plants or crops being windrowed or delivered to another section of harvesting apparatus, as described in the aforementioned patents.

It is a principal object of the present invention to provide, in an agricultural implement including a pair of counter-rotating disks, means permitting selective adjustment of the relative lateral positions of the axes of rotation of the disks to adapt the implement to perform different functions.

Another object is to provide novel and improved apparatus for selectively adjusting the lateral spacing of the axes of rotation of a pair of flat disks mounted at the forward end of an agricultural implement while maintaining the axes in parallel relation.

Other objects will in part be obvious and will in part appear hereinafter.

SUMMARY OF THE INVENTION

The agricultural implement of the present invention includes a rigid framework mounted on wheels for attachment to a tractor, or the like, for movement through a field. A pair of disks are mounted upon the lower ends of a pair of parallel drive shafts with power drive means imparting rotation in opposite directions to the drive shafts and thereby to the disks. The drive shafts extend through respective, hollow tubes or sleeves to which a plurality of plates are rigidly attached. First and second pairs of plates are attached at vertically spaced positions on the sleeves, the plates of each pair being parallel with and spaced from one another on opposite sides of the sleeves. Also, each of the plates has an opening, horizontally aligned with the opening in the other plate of the pair, and a hollow, tubular member rigidly attached to the plates extends between the openings therein.

The implement frame includes rigidly attached, vertical and horizontal members arranged at the front of the machine in a plane generally normal to the direction of movement of the machine, and attached to the rear frame portion for vertical movement with respect thereto. A pair of elongated guide members extend forwardly and outwardly at an acute angle to the longitudinal axis or centerline of the machine from rigid attachment to forward frame members on each side of the implement's centerline and evenly spaced therefrom. The guide members extend through the openings in each pair of spaced plates and the hollow members extending therebetween to support the latter for sliding movement along the guide members. Thus, the sleeves, and the drive shafts, disks and power drive means supported thereby, are movable together with the plates, along linear paths extending at an angle to the direction of movement of the machine. This permits selectively variable lateral spacing of the drive shafts and thereby the axes of rotation of the disks.

Movement of the plates between inner and outer limits along the guide members changes the lateral spacing of the disk peripheries which may be overlapped by a desired distance, or spaced apart, depending upon the disk diameter and lateral distance between inner and outer limits of movement. The disk diameter may also be varied by replacing disks of one diameter with those of a different diameter to provide additional latitude in the amount of lateral adjustment of the disk peripheries.

BRIEF DESCRIPTION OF THE DRAWINGS

FIG. 1 is a perspective view of an agricultural implement embodying the invention;

FIG. 2 is a fragmentary, perspective view of a forward portion of the apparatus of FIG. 1, showing in more detail structure of the present invention;

FIG. 2a is a perspective view of a fragment of the structure shown in FIG. 2.

DETAILED DESCRIPTION

Figure 3:
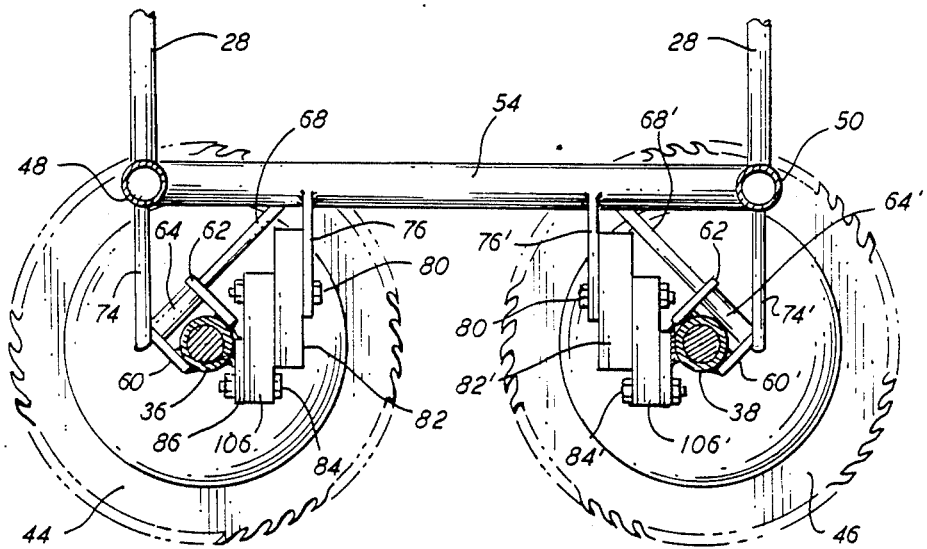
FIGS. 3 and 4 are top plan views in horizontal section on the line 3—3 of FIG. 2, of the lower portion of the structure at the forward end of the apparatus showing certain elements in two positions of relative movement.

Referring now to the drawings, an agricultural implement embodying the invention is shown in FIG. 1, designated generally by reference numeral 10. Implement 10 is adapted to be connected to a tractor drawbar by means of a tongue, a portion of which is indicated at 12, forming part of a rigid main frame having a rear portion including generally horizontal 14 and vertical 16 frame members. The frame is transported upon a pair of rear-mounted wheels 18, one of which is shown in FIG. 1, and gauge wheel 19. Various portions of implement 10 are hydraulically powered and for such purpose hydraulic fluid tank 20 and radiational coolers 22 are provided, being connected to one another and to the hydraulically powered elements by flexible hoses which are conventional and, therefore, not shown in order to simplify the drawing.

Endless belt 24, having outwardly projecting, laterally extending lugs 26, is supported upon the frame for fore-and-aft movement under hydraulic power. The centerline of the implement is assumed to extend down the center of belt 26. The forward portion of the implement frame is attached and supported with respect to the rear frame portion by a parallelogram linkage including upper and lower links 28 and 30 on each side and is vertically movable with respect thereto by hydraulic cylinders 32. Springs 34 provide a resilient support for the forward frame portion of the machine. A pair of hollow sleeves 36 and 38 are supported at the forward end of the machine, and extending through each sleeve are drive shafts connected at their upper ends to a respective pair of hydraulic motors 40 and 42, and at their lower ends to flat, circular disks 44 and 46. Sleeves 36 and 38, and the drive shafts extending therethrough are tilted forwardly at the upper ends at a small angle, but are considered to be substantially vertical. The disks are illustrated as having a conventional, sawtooth periphery, but may advantageously employ the unique notched peripheral configuration of aforementioned U.S. Pat. No. 3,999,613. All other structural elements and the manner of operation thereof thus far described may be found in essentially the same form in prior commercial forms of agricultural equipment of this type.

The unique features of the present invention are embodied in the structure which supports hollow sleeves 36 and 38, and thus the drive shafts, motors and disks, for relatively adjustable, lateral movement, which will now be described. The framework at the forward end of the machine includes vertical members 48 and 50, joined at the top by horizontal member 52, and at a medial position by horizontal frame member 54. The support structure is shown in more detail on only one side of the machine in FIG. 2, all elements being duplicated on the opposite side, and equally spaced from the centerline of implement 10. As seen in FIG. 2, a pair of plates 56 and 58 are welded in spaced, parallel relation to opposite sides of sleeve 36 at a lower position thereon. A second pair of plates 60 and 62, one being seen in FIG. 2 and both in FIGS. 3 and 4, are welded to opposite sides of sleeve 36 directly above and parallel to plates 56 and 58.

Figure 4:
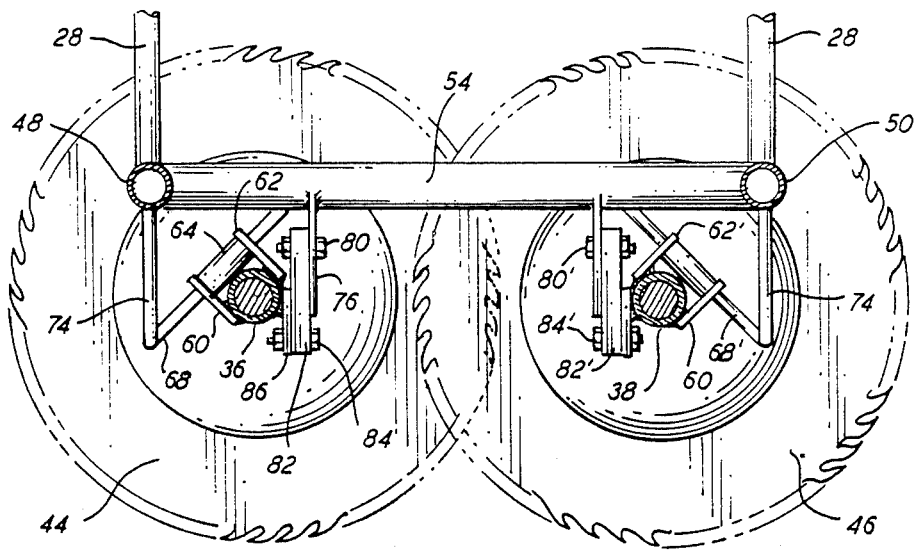

Hollow tubular member 64 is rigidly affixed to and extends between plates 60 and 62, as seen in FIGS. 3 and 4, in alignment with openings in the plates having diameters approximately equal to the inside diameter of tubular member 64. Plates 56 and 58 are joined in the same manner by a hollow tubular member (not shown) and include openings aligned therewith. Lower and upper horizontal guide members 66 and 68, respectively, are rigidly affixed to and extend from vertical frame member 70, and are connected at their opposite ends by vertical support member 72. Support member 74 is rigidly attached at one end to the outer end of guide member 68 and at the other to frame member 48. Similarly, support member 76 extends from an attachment to guide member 66 at one end to an attachment to frame member 48 at the other. Thus, support members 72, 74 and 75 provide a rigid support structure, attached to forward portions of the frame of the machine, for guide members 66 and 68.

Plate 76 is welded to frame cross member 54, extending forwardly therefrom, and includes two openings, one of which is denoted in FIG. 2 by reference numeral 78. Bolt 80 extends through the other opening, in the positions of the elements shown in FIG. 2, securing plate 76 and spacer block 82 which in turn is secured by bolt 84 to plate 86, welded to and extending forwardly from sleeve 36. The relative positions and manner of attachment of plates 76 and 86, by means of block 82 and bolts 80 and 84 are also seen in FIG. 4, wherein the elements are in the same position as in FIG. 2.

Bracket 88 is welded to flange member 90 which is positioned at one side of and assists in supporting and positioning belt 24, constituting a portion of the implement frame. Bolts 92 and 94 secure block 96 to plates 88 and 98, respectively, the latter being welded to sleeve 36. Thus, sleeve 36 is fixedly supported with respect to the forward portion of the machine frame near its upper end by plates 76 and 86, interconnected by block 82 and bolts 80 and 84, and near the lower end by plates 88 and 98, block 96 and bolts 92 and 94. Also, bracket 100 is affixed to the mounting flange of motor 40 and by bolt 102 to plate 104 which is welded to frame member 48, which assists in supporting and stabilizing the upper end of sleeve 36 and the elements carried thereby.

It may thus be seen that by removing bolts 80 and 84 at the top, and bolts 92 and 94 at the bottom, as well as bolt 102, sleeve 36 and the drive shaft, motor 40 and disk 44 may be moved by sliding tubular member 64, and the like tubular member supported between plates 56 and 58, upon guide members 68 and 66, respectively. This changes the position of the axis of rotation of disk 44 relative to the longitudinal axis of the machine since guide members 66 and 68 extend parallel to one another along axes which are arranged at an angle, preferably about 45°, to the centerline. In moving from the position shown in FIGS. 2 and 4 to the position shown in FIG. 3, for example, plates 56 and 60 are moved to the outer extremities of guide members 66 and 68, respectively, thereby moving the axis of rotation of disk 44 a greater distance from the machine centerline. Bolts 80 and 84 may then be replaced with spacer block 106 positioned between block 82 and plate 86 to fill the additional space between plate 76, which remains stationary, and plate 86, which has been moved outwardly with sleeve 36.

When bolt 80 is replaced, it extends through opening 78 in plate 76. Likewise, bolt 92 is replaced through opening 108 in bracket 88 and an additional spacer block, corresponding to block 106, is positioned on the opposite side between block 96 and plate 98. Opening 110 in plate 104 (FIG. 2a) is used for replacement of bolt 102 since bracket 100 also moves linearly as sleeve 36 is shifted between the positions of FIGS. 3 and 4. The elements which have been described on the left side of the machine and which are duplicated on the right side in the plan views of FIGS. 3 and 4 are designated by the same reference numerals, with a prime mark thereafter. The structure and operation of such elements is the same on both sides and is therefore not repeated.

It may thus be seen that the present invention provides means for selectively varying the spacing of the axes of rotation of the disks. Although the particular structure illustrated and described permits adjustment between two discrete positions, other positions within the limits of movement of the elements along guide members 66 and 68 (and 66' and 68') may obviously be provided, if desired, simply by proper positioning of the openings for the bolts and providing spacer blocks of proper thickness. The axes of rotation of the disks remain evenly spaced on each side of the centerline of implement 10 in all posisions of lateral adjustment.

The purpose of providing adjustable spacing of the disk centers, as previously mentioned, is to expand the capabilities of the machine. For example, when the machine is to be used for pulling and severing crops, such as the stems of tomato plants, disks 44 and 46 are placed with their adjacent peripheries in overlapped relation, as in FIG. 4, the usual amount of overlap being about 3½ inches. By changing the elements to the position of FIG. 3 the adjacent peripheries of disks 44 and 46 may be placed in spaced relationship. If a greater space between the disk peripheries is desired beyond that provided when the elements are at the outer limits of movement, disks 44 and 46 may be replaced by disks of smaller diameter, such disks being commercially available in at least two different diameters, namely, 32" and 29⅛". This would provide a spacing of some 6" to 8" of the disk peripheries which is ideal for row forming, i.e., for preparing the soil for the planting of tomatoes, or the like, in spaced rows. It is also advantageous when using the machine to windrow plants already severed and on the ground. In the latter application, the disks would be rotated at a slower speed, which is adjustable by the use of conventional variable-speed valves on the hydraulic motors which drive the disks. The lower run of belt 26 moves rearwardly as the machine is moved through the field, serving to hold the plants in the desired windrows.

What is claimed is:

1. In an agricultural implement of the type having forward and rear ends, a rigid frame mounted upon wheels for movement through a field and a pair of circular disks mounted upon power-driven drive shafts at the forward end for rotation about parallel, substantially vertical axes which are evenly spaced on opposite sides of the longitudinal centerline of the implement, the improvement comprising:
   (a) at least two elongated, substantially horizontal guide members rigidly affixed to the forward end of the implement frame and extending forwardly and outwardly therefrom at equal, acute angles to the longitudinal centerline of the implement, said guide members being equally spaced from and on opposite sides of said centerline;
   (b) means for mounting the disk drive shafts upon the respective guide members for movement thereon between first and second positions wherein the distance between said rotational axes is changed between first and second values, respectively; and
   (c) means for releasably fixing said drive shafts in said first and second positions.

2. The invention according to claim 1 wherein a pair of said guide members are provided on each side of said longitudinal axis, the guide members of each pair being parallel and vertically arranged with respect to one another.

3. The invention according to claim 2 wherein said equal angles are about 45°.

4. The invention according to claim 2 wherein said mounting means include a hollow sleeve surrounding each of said drive shafts and means rigidly affixed to said sleeves and slideably mounted upon said guide members.

5. The invention according to claim 4 wherein said rigidly affixed means comprise a pair of plates affixed to opposite sides of said sleeves adjacent and extending toward each of said guide members, said plates having openings therein through which said guide members loosely pass, whereby said plates are slideable along said guide members.

6. The invention according to claim 5 and further including a hollow tubular member extending between and affixed to said pair of plates in alignment with said openings, said guide member passing loosely through said tubular member for slideable movement of the latter upon said guide members.

7. The invention according to claim 4 and further including means for releasably affixing said sleeves to fixed portions of the implement frame.

8. The invention according to claim 7 wherein said means for releasably affixing comprise first plates rigidly affixed to each of said hollow sleeves and second plates rigidly affixed to the forward end of the implement frame, and attachment means including removable bolts for releasably attaching said first plates to said second plates.

9. The invention according to claim 8 and wherein said attachment means further includes at least one spacer member positioned between and releasably attached by said bolts to each of said first and second plates.

10. The invention according to claim 9 wherein said guide members are each attached at one end to the forward end of the implement frame and the guide members of each pair are rigidly attached at the opposite ends to one another by a first support member and to the forward end of the implement frame by second and third support members.

* * * * *